C. G. SIMONDS.
FLUID PRESSURE BRAKE.
APPLICATION FILED JULY 19, 1920.
1,365,795.
Patented Jan. 18, 1921.
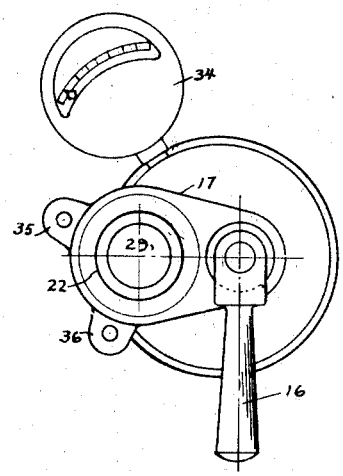
Fig. 1.
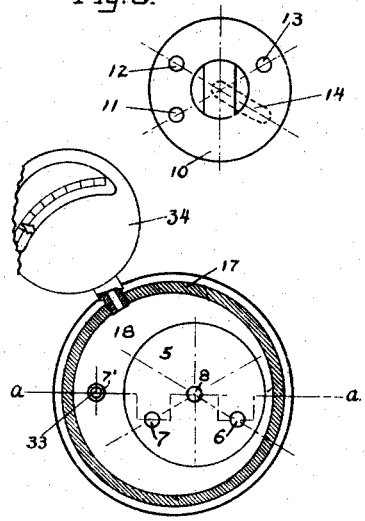
Fig. 3.
Fig. 4.
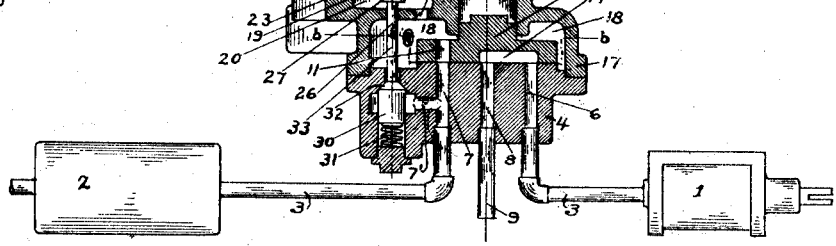
Fig. 2.
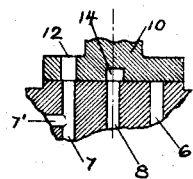
Fig. 5.
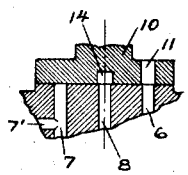
Fig. 6.
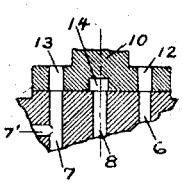
Fig. 7.
INVENTOR.
Charles G. Simonds

UNITED STATES PATENT OFFICE.

CHARLES G. SIMONDS, OF MILWAUKEE, WISCONSIN.

FLUID-PRESSURE BRAKE.

1,365,795.   Specification of Letters Patent.   Patented Jan. 18, 1921.

Application filed July 19, 1920. Serial No. 397,200.

*To all whom it may concern:*

Be it known that I, CHARLES G. SIMONDS, a citizen of the United States, residing at Milwaukee, in the county of Milwaukee and State of Wisconsin, have invented a new and useful Fluid-Pressure Brake, of which the following is a specification.

My invention relates to fluid pressure brakes, and more particularly to air brakes for motor-cars operated in single units in which air is admitted to the brake cylinder direct from a storage reservoir, and the object of my invention is to provide a novel valve construction and arrangement of parts whereby improvements in operation and construction are obtained.

Heretofore air brake systems known as straight air brake systems have required a certain maximum pressure in the reservoir feeding the cylinder, otherwise the motorman could not judge properly how long to leave his valve open to admit the right amount of air to make a proper stop, and, at best he almost always had to turn the valve on and off several times, and sometimes even had to quickly exhaust a part of the air from the cylinder, to avoid sliding the wheels or making too sudden a stop. Of course it would not do to maintain the reservoir pressure as low as the normal braking pressure in the cylinder as a means to relieve the motor-man of this care, because it is sometimes, as in making an unusually short stop, necessary to quickly increase the brake cylinder pressure much above the normal braking pressure. There are automatic air brake systems which do relieve the motor-man of much of this care, but they all require auxiliary reservoirs, triple valves, and other accessories operated secondarily to the motor-man's valve, all of which complicate the brake and make it require frequent inspection and attention to preserve reliability.

With my invention, no triple valve or valve of any kind other than the motorman's valve is required, and the motorman in making regular stops has only to move the valve handle to "service application" position and leave it there until the car stops as the valve will automatically stop the flow of air when the brake cylinder pressure rises to a predetermined sufficient amount. This predetermined pressure may be set to any amount desired and instantly changed by a screw adjustment on the motorman's valve. It can therefore be set to make stops which will produce the least amount of wear and strain of the equipment commensurate with the condition of the road and traffic, and yet be safe because of an immediately available reserve force. When it is necessary to make a quicker stop, or to stop on an unusual down grade requiring greater braking pressure, the motorman has only to move the handle to "emergency position," in which position the flow of air is not automatically stopped. No auxiliary tank is required, and the pressure in the reservoir may be variable, and as high as desired above the maximum breaking pressure.

The valve is so constructed that a gage attached to it reads brake cylinder pressure when the valve is in "service application" position, and reservoir pressure when in other positions, thus showing the exact working condition of the system.

My invention is illustrated in the accompanying drawing, in which—

Figure 1, is a plan view of the brake valve, or motorman's valve; Fig. 2, a vertical section of the valve, taken on line "$a$" of Fig. 4, and shown connected to a reservoir and brake cylinder; Fig. 3, is a plan view showing the valve proper removed from the body; Fig. 4, a transverse section taken on line "$b$" of Fig. 2; and Figs. 5, 6, and 7, are parts of vertical sections taken on line "$a$" showing the valve seat and valve in different positions.

Referring to Fig. 2, 1 represents a brake cylinder connected to a storage reservoir 2 by a passage-way for fluid consisting of a pipe-line 3, in which the base 4 of the valve is connected so as to intercept the flow of fluid from the reservoir to the brake cylinder. There is a valve seat 5, consisting of a flat smooth surface, on base 4, provided with ports 6, and 7, respectively leading through the base to and from said pipe line. There is also a port opening 8, through said base leading from the center of said valve seat to an exhaust pipe represented by 9. A valve 10, having ports 11, 12, and 13, and a recess 14, shown dotted in Fig. 3, is connected by a tongue and groove to valve stem 15, and is rotated on valve seat 5 by a handle 16 attached to said stem. The body 17 of the device provides a bearing for said valve stem, and forms a chamber 18 about the said valve 10. A diaphragm 19, consisting of a disk of flexible material, covers a chamber 20 in 17, which communicates with chamber 18 through an opening 21.

A cylindrical part 22, threaded in 17, holds the diaphragm air tight on a ledge 23 concentric with chamber 20. A disk 24 forms a backing for the diaphragm and a base for a compression spring 25, and is provided with a stem 26, which leads down through the center of the diaphragm and through the wall below chamber 20 into chamber 18. A shoulder 27 on said stem contacting with said wall limits movement of the diaphragm downward, and a shoulder 28, on the inside of cylinder 22, limits movement upward. There is a thumb piece 29, threaded in 22, for adjustment of spring 25. There is a bypass 7′, connecting 7 with chamber 18, which is intercepted by a check valve 30. Said valve 30, is held by a spring 31 up against its seat 32 in base 4, and is provided with a stem 33, which extends up through the discharge opening of 7′ into chamber 18 sufficiently to meet 26. A pressure gage 34, connecting with chamber 18, is attached to body 4, and lugs 35, and 36, on body 4 are provided for bolting the valve to the vehicle.

The operation of my invention is as follows,—

When handle 16 and valve 10 are in the position shown in Fig. 2, any fluid in brake cylinder 1 is free to pass out through 3, 6, 14, and 8, to exhaust pipe 9. Chamber 18 and gage 34 are now in communication with reservoir 2 through 11, 7, and 3, and the gage indicates the reservoir pressure, but there is no flow of fluid from the reservoir. This position is called the "exhaust" or "release position". When handle 16 is moved to rotate valve 10 to the right, recess 14 moves off of port 6, and valve 10, now covering 6, closes the passage from the brake cylinder as shown in Fig. 5. Also valve port 11 passes off of port 7, but port 12 comes over port 7, thereby connecting the reservoir to chamber 18 as before so as to permit gage 34 to still indicate reservoir pressure. In this position of the valve, which is known as "lap position", there is no flow of fluid either from the reservoir or from the brake cylinder, and if there is any pressure in the brake cylinder it will remain until the valve is moved back to release position.

When the handle is moved to the right from "lap position" port 11, as shown in Fig. 6, moves over port 6, thereby permitting a flow of fluid from chamber 18 to the brake cylinder. Port 7 is closed by valve 10, but fluid is free to flow from the reservoir into chamber 18 through the bypass 7′ until the pressure in the brake cylinder and chambers 18 and 20 reaches a predetermined amount sufficient to move diaphragm 19 and disk 24 upward against spring 25. When this predetermined pressure is reached, with consequent movement of said diaphragm, check valve 30, which has been held open by the pressure of spring 25 acting through stems 26 and 33, instantly closes, and the flow of fluid from the reservoir is automatically stopped. The reservoir is now entirely cut off from chamber 18 which, however is in communication with the brake cylinder, and the gage indicates brake cylinder pressure. This pressure was predetermined by adjusting thumb piece 29 which regulates the resisting pressure produced by the compression spring 25, and should be determined by trial to obtain the most proper pressure for making normal stops of the vehicle. This position of the manually operated valve 10 is known as the "service application" position.

When it is desired to make a sudden stop, or one quicker than normal, the pressure in the brake cylinder may be instantly increased by moving the handle to the right from "service application" position until valve port 13 comes over port 7, and valve port 12 over port 6, as shown in Fig. 7, thereby permitting a free flow of fluid from the reservoir through chamber 18 to the brake cylinder. This position of the manually operated valve 10 is known as the "emergency position".

Various changes in the form and design of the mechanism may be made without departing from the spirit of my invention, and;

What I claim is—

1. In a fluid pressure brake, the combination with a brake cylinder, reservoir, and passage-way for fluid from said reservoir to said cylinder, of valve mechanism intercepting and normally closing said passage-way comprising manually operated mechanism having a service-application position adapted to open said passage-way to admit fluid from said reservoir to said cylinder, and automatic mechanism adapted to close said passage-way while said manually operated mechanism remains in said position and the pressure in said cylinder rises to a predetermined amount.

2. In a fluid pressure brake, the combination with a brake cylinder, reservoir, and passage-way for fluid from said reservoir to said cylinder, of valve mechanism intercepting and normally closing said passage-way comprising manually operated mechanism having a service-application position adapted to open said passage-way to admit fluid from said reservoir to said cylinder and automatic mechanism adapted to close said passage-way while said manually operated mechanism is in said service-application position when the pressure in said cylinder rises to a predetermined amount, and means for adjusting said automatic mechanism to close said passage-way at any desired brake cylinder pressure lower than the pressure in said reservoir.

3. In a fluid pressure brake, the combination with a brake cylinder, reservoir, and passage-way for fluid from said reservoir to said cylinder, of valve mechanism intercepting and normally closing said passage-way comprising manually operated mechanism having a service-application position and an emergency position adapted to open said passage-way to admit fluid from said reservoir to said cylinder and automatic mechanism adapted to close said passage-way at a predetermined brake-cylinder pressure when said manually operated mechanism is in said service-application position and to not close said passage-way when said manually operated mechanism in in said emergency position, and means for adjusting said automatic mechanism for different brake cylinder pressures.

4. In a fluid pressure brake, the combination of a brake valve and pressure gage, connected to said valve, of means within said valve for admitting brake cylinder pressure to said gage when said valve is set to apply the brakes and for admitting reservoir pressure to said gage when said valve is otherwise set.

CHARLES G. SIMONDS.

Witnesses:
E. D. BENNETT,
MICHAEL LAFFEY.